(12) United States Patent
Foltzer

(10) Patent No.: US 6,411,748 B1
(45) Date of Patent: Jun. 25, 2002

(54) WIDE TUNING RANGE ACOUSTO-OPTICAL FIBER BRAGG GRATING FILTER (FBGF)

(75) Inventor: Lawrence E. Foltzer, Occidental, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 32 days.

(21) Appl. No.: 09/617,576

(22) Filed: Jul. 17, 2000

(51) Int. Cl.$^7$ .................... G02F 1/335; G02B 6/26; G02B 6/42
(52) U.S. Cl. ................ 385/7; 385/10; 385/4; 385/18; 385/37; 385/42
(58) Field of Search ............. 385/4, 7, 18, 22, 385/37, 10, 12, 14, 15, 31, 42

(56) References Cited

U.S. PATENT DOCUMENTS

| | | | |
|---|---|---|---|
| 5,892,582 A | 4/1999 | Bao et al. | 356/345 |
| 5,982,791 A | 11/1999 | Sorin et al. | 372/25 |
| 5,999,546 A | 12/1999 | Espindola et al. | 372/20 |
| 6,044,189 A | 3/2000 | Miller | 385/37 |
| 6,052,497 A * | 4/2000 | Graebner | 385/7 |
| 6,253,002 B1 * | 6/2001 | Kim et al. | 385/27 |
| 6,256,428 B1 * | 7/2001 | Norwood et al. | 385/17 |

OTHER PUBLICATIONS

Stephen B. Alexander, Ciena Corp.; "Dense Wavelength Division Multiplexing"; http://www.tdap.com/tdat/broadband/broadb (Ciena) .html; 4 pages; 1997.

Dr. Robert J. Feuerstein, Univ. of CO at Boulder; "Wavelength Division Multiplexing and Optical Networks"; http://itp.colorado.edu/~tlen5834/Lecture/Lecture_1/Lecture1.htm; 21 pages; Jun. 2, 1999.

* cited by examiner

Primary Examiner—Brian Healy
Assistant Examiner—Kevin S Wood
(74) Attorney, Agent, or Firm—Danamraj & Youst PC; Jessica W. Smith; V. Lawrence Sewell

(57) ABSTRACT

An acousto-optical filter having a wide tuning range and a method of making the same. An acoustic transducer is provided for generating an acoustic pressure wave of a selected frequency that is propagated longitudinally along an optical fiber member. The pressure wave generates a plurality of alternating localized compressions and rarefactions in the optical fiber such that a grating (i.e., periodic changes in the fiber's refractive index) is created therein. The grating reflects optical signals of a particular wavelength depending upon its period or pitch (i.e., Bragg resonance wavelength). The acoustic pressure wave's frequency is modulated by controlling the acoustic transducer such that a variable grating pitch is obtained, thereby causing a corresponding change in the Bragg resonance wavelength of the grating. In response, a reflected optical signal selected from incoming multiplexed optical signals tunes to a different wavelength. A closed-loop controller is provided for controlling input signals to the acoustic transducer/actuator so as to modulate the tuning of the reflected optical signals.

22 Claims, 4 Drawing Sheets

WIDE TUNING RANGE ACOUSTO-OPTICAL FIBER BRAGG GRATING FILTER (FBGF)

CROSS-REFERENCE TO RELATED APPLICATION(S)

This application discloses subject matter related to the subject matter disclosed in the following commonly owned patent application: "Wide Tuning Range Fiber Bragg Grating Filter (FBGF) Using Muscle Wire," filed Dec. 28, 1999, Ser. No.: 09/473,754, in the name(s) of: Lawrence E. Foltzer.

BACKGROUND OF THE INVENTION

1. Technical Field of the Invention

The present invention relates to optical network elements and, more particularly, to an acousto-optical fiber Bragg grating filter (FBGF) having a wide tuning range and a method of making the same.

2. Description of Related Art

As networks face increasing bandwidth demand and diminishing fiber availability in the existing fiber plant, network providers are migrating towards a new network technology called the optical network. Optical networks are high-capacity telecommunications networks comprised of optical and opto-electronic technologies and components, and provide wavelength-based services in addition to signal routing, grooming, and restoration at the wavelength level. These networks, based on the emergence of the so-called optical layer operating entirely in the optical domain in transport networks, can not only support extraordinary capacity (up to terabits per second (Tbps)), but also provide reduced costs for bandwidth-intensive applications such as the Internet, interactive video-on-demand and multimedia, and advanced digital services.

Of the several key enabling technologies necessary for the successful deployment of optical networks, two are particularly significant: dense wavelength division multiplexing (DWDM) and Erbium-Doped Fiber Amplifiers (EDFAs). DWDM is a fiber-optic transmission technique that has emerged as a crucial component for facilitating the transmission of diverse payloads regardless of their bit-rate and format over the optical layer. DWDM increases the capacity of embedded fiber by first assigning incoming optical signals to specific wavelengths within a designated frequency band (i.e., channels separated by sub-nanometer spacing) and then multiplexing the resulting signals out onto a single fiber. Because incoming signals are not terminated in the optical layer, the interface is bit-rate and format independent, allowing service/network providers to integrate the DWDM technology with existing equipment in the network.

By combining multiple optical signals using DWDM, they can be amplified as a group and transported over a single fiber to increase capacity in a cost-effective manner. Each signal carried can be at a different rate (e.g., Optical Carrier (OC)-3, OC-12, OC-48, etc.) and in a different format (e.g., Synchronous Optical Network (SONET) and its companion Synchronous Digital Hierarchy (SDH), Asynchronous Transfer Mode (ATM), Internet Protocol (IP) data, etc.).

Current advances in DWDM technologies allow a large number of wavelengths to be multiplexed over a fiber using sub-nanometer spacing. For example, up to 32 channels or carriers may be spaced 100 GHz apart (equal to 0.8 nm) in a multiplexed optical signal operating at around 1550 nm. In contrast, some of the standardized, "coarse" wavelength separations include 200 GHz spacing (1.6 nm) and 400 GHz spacing (3.2 nm), both at around 1550 nm.

Several advances are also taking place in the field of optical amplifiers which operate in a specific band of frequency spectrum and boost lightwave signals to extend their reach without converting them back to electrical form. To optically amplify the individual wavelengths of multiplexed signals, optical amplifiers need to have a gain bandpass that extends over the entire range of the DWDM signal's bandwidth. For example, for 32 channels with a spacing of 0.8 nm around the 1550 nm band, the signal bandwidth is about 26 nm and, accordingly, the spectral gain profile of the optical amplifier should cover at least this range. Advanced optical amplifiers such as the EDFAs—which have a gain profile of about 30 to 50 nm—are currently being employed in optical networks using DWDM transmission techniques.

Those skilled in the art should readily recognize that in order to fully realize the benefits of such advances as DWDM techniques and EDFAs in optical networks, the ability to separate the individual wavelengths in a multiplexed optical signal is critical because these wavelengths typically need to be routed to individual detectors at the end of the transmission. Although various optical filtering technologies are currently available for this purpose, there exist several drawbacks and deficiencies in the state-of-the-art solutions.

For example, wavelength separators using interference filters and Fabry-Perot filters typically have a low resolution which renders them a poor choice for the sub-nanometer spacing of the current DWDM techniques. Further, these filters do not have a quick enough response time for achieving any degree of tunability, that is, the ability to select different wavelengths using the same filter, in a practical manner.

Optical filters made of fiber Bragg gratings offer excellent resolution characteristics. However, current fiber Bragg gratings are typically provided as "inherent" gratings wherein the grating is "written" into optical fibers as a fixed structure such that tuning is possible only by altering the length of the fiber on a macro scale. In general, such fixed Bragg gratings allow tuning over a few nanometers only, which approximates to about 5 or 6 channels. Clearly, this tuning range is insufficient to cover the channel bandwidth of the advanced DWDM systems described hereinabove.

Based upon the foregoing, it should be apparent that there is an acute need for an optical filter solution that provides a wide tuning range for selecting wavelengths among a large number of channels available in today's DWDM systems. Additionally, it would be advantageous to have a narrow optical passband (for the selected wavelength) so as to be able to tune to a particular wavelength more precisely without optical crosstalk effects. It would be of further advantage to provide the capability for tuning over a range that is at least co-extensive with the gain profiles of the advanced EDFAs used in current optical networks. The present invention provides such a solution.

SUMMARY OF THE INVENTION

Accordingly, the present invention is discloses a wide range tunable acousto-optical filter and a method of making the same. An acoustic transducer is provided for generating an acoustic pressure wave of a selected frequency that is propagated longitudinally along an optical fiber member. The pressure wave generates a plurality of alternating localized compressions and rarefactions in the refractive index (RI) of the optical fiber, thereby creating an RI profile. The periodic changes in the RI profile operate as a grating with a corresponding pitch for reflecting optical signals of a particular wavelength (i.e., Bragg resonance wavelength). The acoustic pressure wave's frequency is modulated by controlling the acoustic transducer such that a variable grating pitch is correspondingly obtained, thereby causing a change in the Bragg resonance wavelength of the grating. In response, a reflected optical signal selected from incoming multiplexed optical signals tunes to a different wavelength. A closed-loop controller is provided for controlling input signals to the acoustic transducer/actuator so as to modulate the tuning of the reflected optical signals.

In one exemplary embodiment, the acoustic actuator comprises a discrete transducer that is coupled to an optical fiber. In other exemplary embodiments, the acoustic transducer comprises a section of the optical fiber having a piezoelectric effect or electrostrictive effect. The acoustic pressure wave's frequency is preferably controlled by varying the frequency of the electrical signal that is supplied as input to the transducer.

In another aspect, the present invention is directed to a method of filtering an optical signal in a fiber. An acoustic transducer is driven at a selected frequency to propagate an acoustic pressure wave longitudinally in the fiber. The acoustic pressure wave generates a plurality of alternating localized compressions and rarefactions in the fiber so as to effectuate a grating therein. The grating operates to reflect optical signals of a particular wavelength based on the periodicity of the plurality of alternating localized compressions and rarefactions. Accordingly, the wavelength of the reflected optical signals is controlled by modulating the selected frequency of the acoustic pressure wave.

In yet another aspect, the present invention is directed to a tunable optical filter which includes a fiber having a selected length and RI for conducting optical signals. An acoustic transducer is associated with the fiber for propagating an acoustic pressure wave of a selected frequency through the fiber such that the acoustic pressure wave alters the local RI by generating a plurality of alternating localized compressions and rarefactions in the fiber. A grating is accordingly effectuated in a selected portion of the fiber, wherein the grating reflects optical signals of a particular wavelength based on the periodicity of the alternating localized compressions and rarefactions. A closed-loop controller is provided in association with the acoustic transducer for modulating the frequency of the acoustic pressure wave so as to vary the grating period.

In yet further aspect, the present invention is directed to a method of making a tunable optical filter having an integrated acoustic transducer. A silica tube (preferably pure amorphous quartz) having a selected length and a selected diameter is provided. A core material is deposited by chemical vapor deposition (CVD) inside the silica tube for forming an optical fiber. Thereafter, a selected portion of the optical fiber is heat-treated while under a predetermined electrical stress so as to form a piezoelectric transducer in the selected portion. Upon actuation, the piezoelectric transducer propagates an acoustic pressure wave of a selected frequency along the optical fiber to generate a plurality of alternating localized compressions and rarefactions in the optical fiber so as to effectuate a grating therein. The grating's pitch corresponds to the period of the localized compressions and rarefactions, and is modulated to reflect optical signals of a particular wavelength by controlling the frequency of the acoustic pressure wave.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1A:
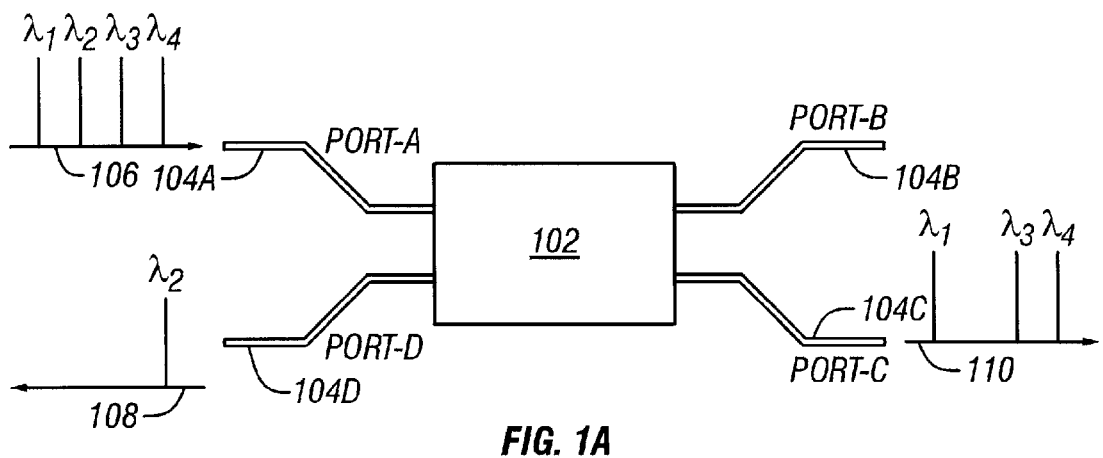
FIG. 1A depicts a fiber Bragg grating (FBG) element disposed in an optical coupler arrangement which exemplifies wavelength selectivity properties of the FBG element.

In the drawings, like or similar elements are designated with identical reference numerals throughout the several views thereof, and the various elements depicted are not necessarily drawn to scale. Referring now to FIG. 1A, depicted therein is a fiber Bragg grating (FBG) element 102 disposed in an optical coupler arrangement that exemplifies wavelength selectivity characteristics of the FBG element 102. As is well known, a fiber Bragg grating is a section of fiber having a selected length that has been modified to contain periodic changes in its index of refraction (or refractive index (RI)) along the length. This spatial periodicity in the index of refraction is generally referred to as the grating pitch. Depending on the space between the changes (i.e., the pitch), a certain frequency of light—the Bragg resonance wavelength—is reflected back, while all other wavelengths pass through the fiber.

Figures 1, 1B:
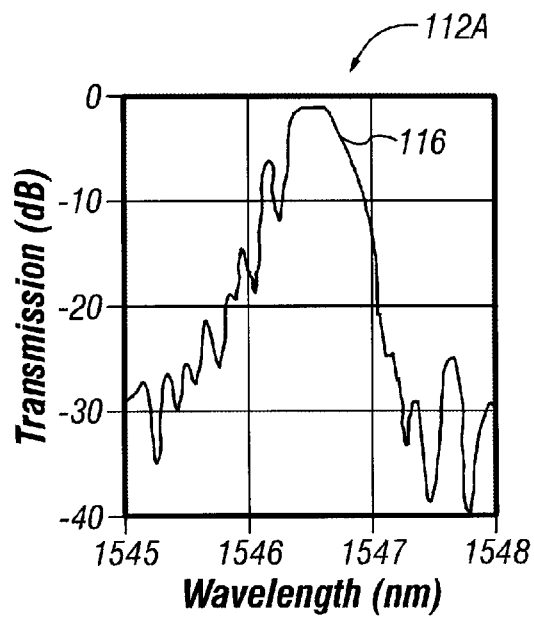
FIG. 1B depicts the signal spectra associated with the FBG element shown in FIG. 1A.

Four ports are exemplified in the optical coupler arrangement shown in FIG. 1: two ports, port-A 104A and port-D 104D, disposed at one terminus and two ports, port-B 104B and port-C 104C, disposed at the other terminus of the FBG element 102. A high degree of optical separation between the two "input" ports, i.e., between port-A and port-D, and the two "output" ports, i.e., port-B and port-C, is typically available in the optical coupler arrangement described herein. For example, a power difference of about 50 dB is maintained between port-A 104A and port-D 104D.

A multiplexed optical signal having four wavelengths, $\lambda_1$–$\lambda_4$, is provided as an incoming signal 106 at the input port-A 104A. In this exemplary arrangement, port-B 104B may be optically terminated by conventional means so that port-C 104C operates as the output port for these wavelengths. As the multiplexed optical signal passes through the FBG element 102, a selected wavelength—the wavelength corresponding to the Bragg resonance wavelength—of the optical signal is reflected back to the optically separated port-D. This reflected signal 108 is exemplified as having a wavelength of $\lambda_2$. The remaining wavelengths, $\lambda_1$, $\lambda_3$ and $\lambda_4$, are transmitted as an output signal 110 at the output port-C 104C.

FIG. 1B depicts the spectra associated with the transmitted and reflected optical signals in the exemplary FBG arrangement described hereinabove. Reference numeral 112A refers to the spectrum of the reflected signal 108 having a peak 116 at around 1546.5 nm. That is, in this example, the Bragg resonance wavelength of the FBG element 102 is provided to be around this wavelength. Reference numeral 112B refers to the spectrum of the transmitted signal 110 and comprises a notch 114 at the wavelength that corresponds to the wavelength ($\lambda_2$) of the peak 116 of the reflected signal 108.

Those skilled in the art will recognize upon reference hereto that the wavelength-specific transmission properties of the FBG element 102 are useful in implementing a suitable optical filter for selecting different wavelengths from a multiplexed optical carrier signal such as, for example, a DWDM optical signal having up to 32 or more channels.

However, as described in the Background section of the present patent application, conventional optical filters using fixed-structure FBG elements have the disadvantage of being tunable over a narrow band of about a few nanometers only (i.e., about 5 or 6 channels).

Figures 1, 1B, 2:
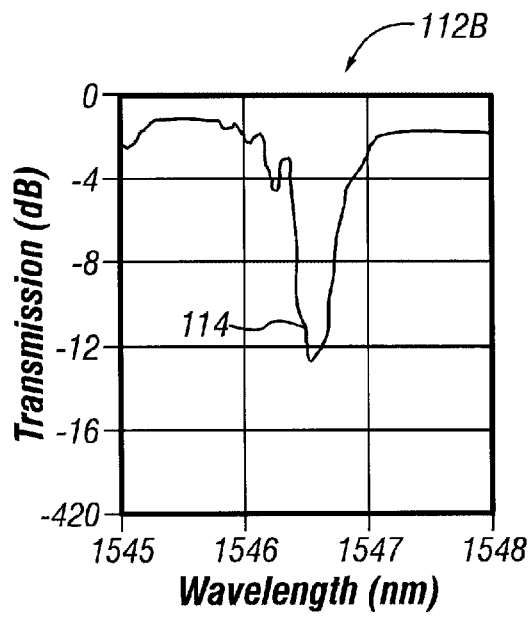
FIG. 2 depicts a dynamically created FBG element by propagating an acoustic pressure wave through an optical fiber.
Figure 2:
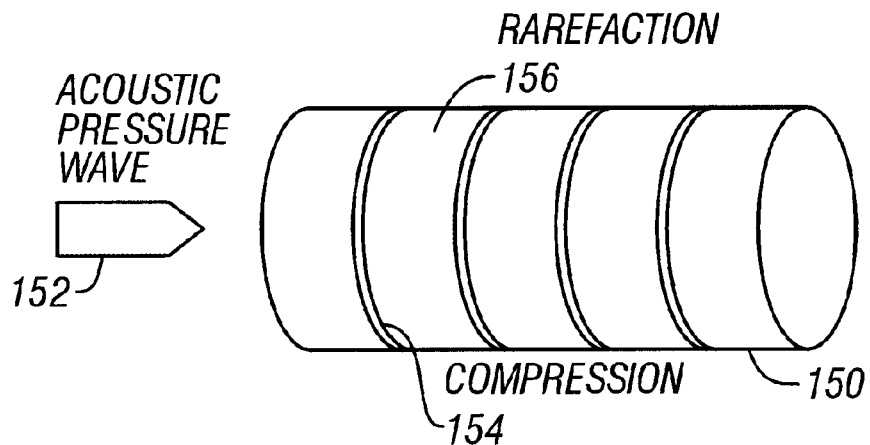

Referring now to FIG. 2, depicted therein is a dynamically created FBG element in accordance with the teachings of the present invention by propagating an acoustic pressure wave 152 through an optical fiber 150 having a selected RI. The acoustic pressure wave 152 is launched by an acoustic transducer actuator (not shown in this FIG.) at a selected frequency and is transmitted longitudinally in the fiber 150. A plurality of alternating localized compressions and rarefactions are generated in the optical fiber 150 due to the propagating acoustic pressure wave, thereby dynamically creating a periodicity in the local RI of the fiber 150. For instance, a compression 154 and a rarefaction 156 are exemplified herein.

Those skilled in the art should readily recognize upon reference hereto that the period of the RI profile created in the optical fiber 150 corresponds to its Bragg resonance wavelength. Further, the RI profile's period is modulated in accordance herewith by altering the frequency of the propagated acoustic pressure wave 152.

Figure 3A:
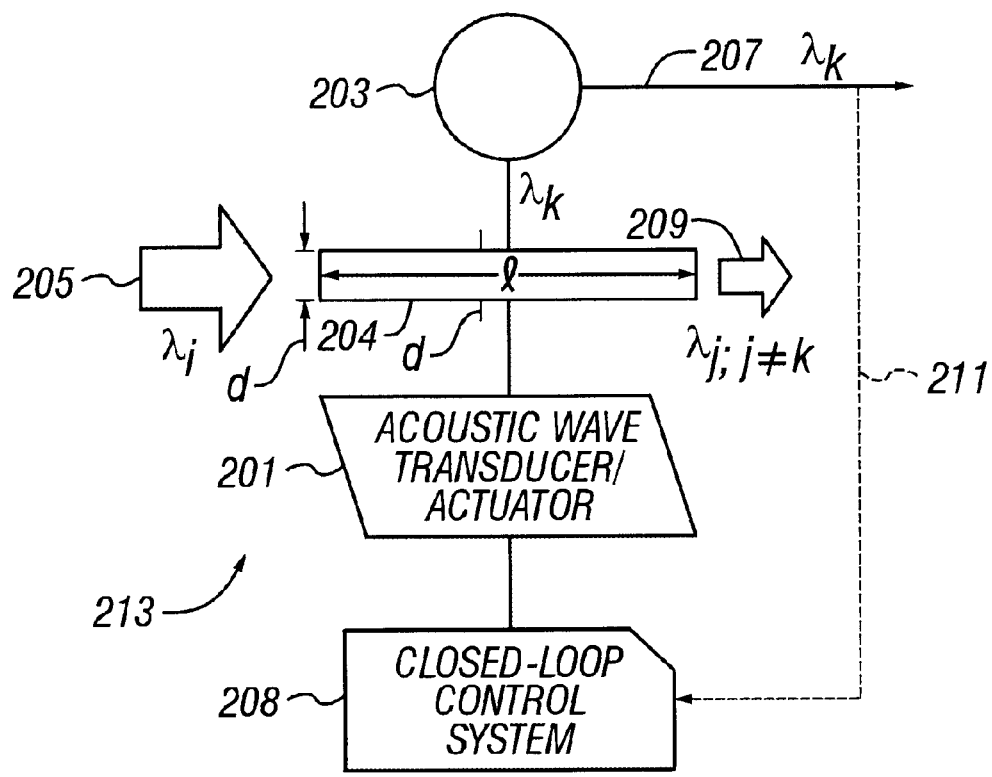
FIG. 3A depicts an exemplary embodiment of a wide tuning range acousto-optical FBG filter (FBGF) provided in accordance with the teachings of the present invention using an acoustic wave transducer actuator.

Referring now to FIG. 3A, depicted therein is a functional block diagram of an optical filter 213 having a wide tunable range, provided in accordance with the teachings of the present invention. An optical fiber 204 of selected physical dimensions i.e., length (l) and diameter (d), and having a particular RI, is associated with an acoustic transducer/actuator 201 such that a acoustic pressure wave is applied to the fiber 204 in a controlled manner. Preferably, the acoustic transducer/actuator 201 operates to generate pressure waves of variable frequencies (for example, in the Gigahertz range) so as to alter the local RI of the fiber 204 controllably, whereby the grating pitch (i.e., the spatial periodicity of the RI of the fiber) is modulated accordingly. The Bragg resonance wavelength associated with the dynamically created FBG element is thus altered correspondingly such that a reflected wave tunes towards a particular wavelength of the tunable range of the filter 213. Thereafter, the reflected wave may be separated using a conventional optical element such as a circulator 203 to provide the reflected signal (having $\lambda_k$ as the wavelength) as a filtered signal output 207 from the filter. Accordingly, multiple wavelengths $\lambda_i$, i=1 to N, of an incoming multiplexed optical signal 205 are individually selected, and the wavelengths not selected may be transmitted as a transmitted signal 209 (having $\lambda_j$, j=1 to N and j≠k) to subsequent optical stages.

Continuing to refer to FIG. 3A, the response of the acoustic transducer/actuator 201 affecting the RI profile of the fiber element 204 is preferably modulated by a closed-loop control system 208 so that the optical filter 213 may be tuned to a particular wavelength of the incoming wavelengths. A feedback path 211 is accordingly provided from the filtered signal output 207 wherein one or more suitable parameters associated with the filtered signal are furnished to the control system 208. Those skilled in the art should appreciate that the filtered signal may be appropriately processed using known optoelectronics before relevant parameters are extracted for the closed-loop feedback purposes.

Figure 3B:
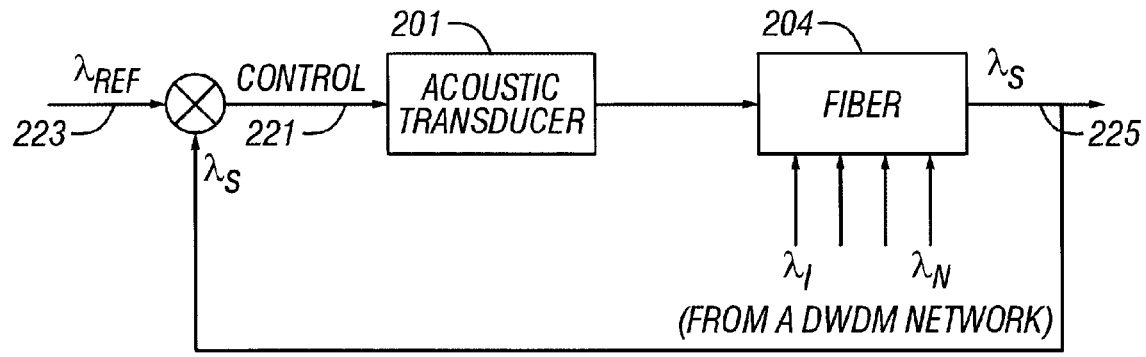
FIG. 3B depicts an exemplary closed-loop arrangement for controlling the wavelength selectivity properties of a wide tuning range FBGF of the present invention by modulating the response of the acoustic transducer.

FIG. 3B depicts an exemplary feedback control arrangement for controlling the wavelength selectivity properties of a wide-range tunable FBGF of the present invention. A control signal 221 is generated based upon comparing a reference input 223 (which may be a reference wavelength $\lambda_{REF}$ or some other relevant optical/electronic parameter that is channel-specific) with an output 225 that corresponds to the selected wavelength $\lambda_s$ filtered by the fiber element 204 wherein a tunable Bragg grating is dynamically created. In a presently preferred exemplary embodiment of the present invention, the period of the RI profile created in the fiber element 204 is altered by changing the frequency of the electrical control signal 221 that drives the acoustic transducer/actuator 201.

The acoustic transducer may comprise a discrete component that is coupled to the fiber 204 or, in some exemplary embodiments, it may comprise a section of the fiber 204 that exhibits the piezoelectric or electrostrictive effect upon actuation. The optical frequency reflected from the dynamically created grating (i.e., $\lambda_s$) is dependent upon the frequency of the electrical control signal 221 that drives the transducer and the ratio of the propagation velocity of sound to light in the optical fiber 204. Since this ratio is large, a relatively "low" acoustic frequency can be used advantageously to create the optical grating in accordance with the teachings of the present invention. For example, an acoustic frequency of about 5 GHz is sufficient to create a grating that reflects optical signals operating at around 193 THz.

It should be apparent that the feedback control arrangement depicted is FIG. 3B is provided for illustrative purposes only. Accordingly, other optoelectronic components such as, for example, circulators, optical-electrical interfaces, etc. are not shown herein.

Figure 4A:
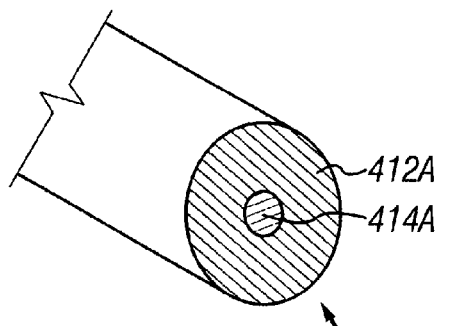
FIG. 4A depicts an exemplary single-mode fiber for use in making a wide-range tunable acousto-optical FBGF of the present invention.
Figure 4B:
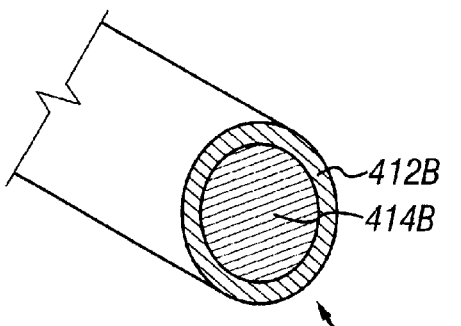
FIG. 4B depicts an exemplary multi-mode fiber for use in making a wide-range tunable acousto-optical FBGF of the present invention.

FIGS. 4A and 4B depict two exemplary fibers for use as an FBG element in a wide-range tunable acousto-optical filter of the present invention. Although a multi-mode fiber 410B having a wider core 414B (diameter of about 50 $\mu$m or 62.5 $\mu$m) surrounded by a thinner cladding 412B is also illustrated herein, a single-mode fiber 410A (diameter of about 125 $\mu$m) having a narrow core 414A (diameter of about 8–10 $\mu$m) surrounded by a thicker cladding 412A is presently preferred.

Figure 5:
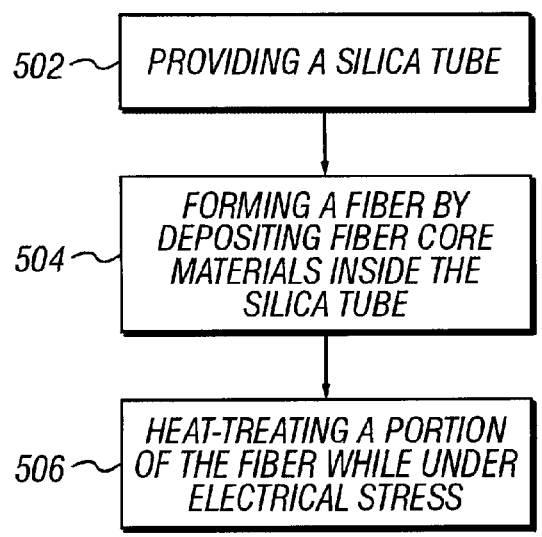
FIG. 5 is a flow chart illustrating an exemplary method of making a fiber Bragg grating element with an integrated acoustic transducer for use in a wide-range tunable acousto-optical FBGF of the present invention.

Referring now to FIG. 5, depicted therein is a flow chart of the various steps involved in making a fiber Bragg element with an integrated acoustic transducer for use in a wide-range optical filter of the present invention. After furnishing a silica tube (preferably substantially pure silica i.e., amorphous quartz) (step 502), an optical fiber is formed by depositing fiber core materials inside the silica tube by means of chemical vapor deposition (step 504). A selected portion of the optical fiber is heat-treated while under appropriate electrical stress (step 506) so as to convert the selected fiber portion to an active piezoelectric or electrostrictive material that can operate as an acoustic transducer/activator.

Figure 6:
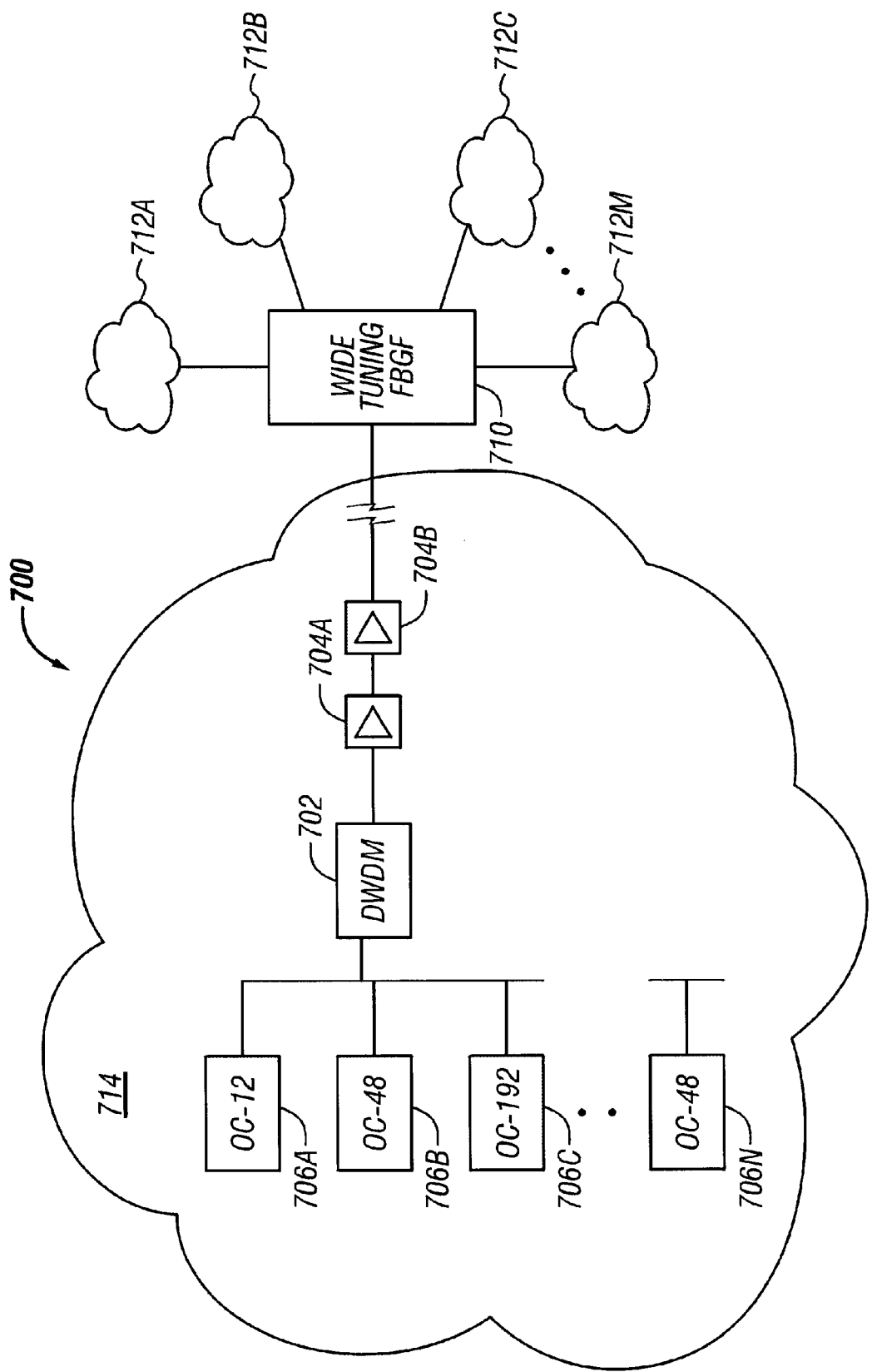
FIG. 6 depicts an exemplary dense wavelength division multiplex (DWDM) optical network wherein a wide-range tunable FBGF of the present invention is advantageously employed.

FIG. 6 depicts an exemplary DWDM optical network 700 where a wide-range tunable optical filter 710 of the present invention may be advantageously employed. An optical network portion 714 (for example, a long-haul network, a regional network, et cetera) includes a DWDM system 702 for multiplexing several optical signals (e.g., 706A–706N) on the same fiber, wherein each signal—which may be carrying a separate payload with a particular bit rate—is assigned a particular wavelength (i.e., channel). For example, multiple OC-12, OC-48, OC-192 signals are illustrated herein.

Optical amplifiers with suitable gain profiles, e.g., amplifier 704A and amplifier 704B, are included in order to compensate for transmission losses in the network portion 714. Upon receiving the multiplexed signal, the optical filter 710 separates the individual wavelengths and provides the signals to access networks such as, e.g., networks 712A–712M. Those skilled in the art should appreciate that the wide-range tunable optical filter 710 may also be embodied as a tunable optical Add/Drop Multiplexer (OADM) on a SONET ring that is coupled to the various access networks.

Based upon the foregoing Detailed Description, it should be readily apparent that the present invention provides an effective acousto-optical filter solution that advantageously overcomes the shortcomings and deficiencies of the conventional optical filters (which employ "inherent" fiber Bragg gratings) used in today's optical networks. Whereas in the inherent FBGs the grating is a fixed structure that is "written" into them and is tunable by changing the length of the grating on a macro scale by compressing or stretching the fiber, the acousto-optical grating disclosed herein is created dynamically by varying the acoustic pressure wave's frequency. A tunable optical filter provided in accordance with the teachings of the present invention exhibits a wide bandwidth performance that is highly desirable in terms of harnessing the benefits of advanced technologies such as DWDM techniques and EDFAs that are necessary in All Optical Network of the Future (AONF) and "deep fiber" network architectures. In addition to having a wide tuning range, the acousto-optical filter of the present invention provides a narrow optical passband with a sharp cutoff because of the narrow notch in the transmitted wavelengths, thereby ensuring that little or no cross-channel interference exists in the wavelength selection process.

Further, it is believed that the operation and construction of the present invention will be apparent from the foregoing Detailed Description. While the method and apparatus shown and described have been characterized as being preferred, it should be readily understood that various changes and modifications could be made therein without departing from the scope of the present invention as set forth in the following claims. For example, while a wide-range tunable optical filter provided in accordance herewith may be gainfully employed in DWDM applications, it can also be combined with an active medium to produce a tunable wavelength light source. Also, those skilled in the art should readily recognize that several bonding/coupling techniques are available for coupling discrete acoustic transducer members with optical fibers in making a wide-range tunable optical filter of the present invention and, accordingly, the present invention may be practiced with all such techniques.

In addition, although the use of fibers optimized for 1550 nm signals (where transmission losses are about 0.25 dB/km) is exemplified, it should be apparent that fibers for 1310 nm signals (having transmission losses of about 0.5 dB/km) may also be used for making an optical filter in accordance herewith. Moreover, the present invention may be practiced with any known or hitherto unknown techniques of feedback control for the purpose of controlling electrical signal inputs to the acoustic transducer/actuator members which may vary in number. Accordingly, all these numerous modifications, substitutions, additions, combinations, extensions, et cetera, are considered to be within the ambit of the present invention whose scope is limited solely by the following claims.

What is claimed is:

1. A tunable optical filter, comprising:
    a fiber having a selected length and refractive index for conducting optical signals;
    an acoustic transducer integrated into said fiber for propagating an acoustic pressure wave of a selected frequency, said acoustic pressure wave altering said refractive index by generating a plurality of alternating localized compressions and rarefactions in said fiber so as to effectuate a grating therein, wherein said grating reflects optical signals of a particular wavelength based on the periodicity of said plurality of alternating localized compressions and rarefactions; and
    a closed-loop controller associated with said acoustic transducer for modulating said selected frequency of said acoustic pressure wave.

2. The tunable optical filter as set forth in claim 1, wherein said closed-loop controller actuates said acoustic transducer by applying an electrical signal input to said acoustic transducer.

3. The tunable optical filter as set forth in claim 2, wherein said selected frequency of said acoustic pressure wave is modulated by varying said electrical signal input's frequency.

4. The tunable optical filter as set forth in claim 1, wherein said selected frequency of said acoustic pressure wave is substantially at around 5 Gigahertz.

5. The tunable optical filter as set forth in claim 1, wherein said fiber comprises a single-mode fiber.

6. The tunable optical filter as set forth in claim 1, wherein said fiber comprises a multi-mode fiber.

7. The tunable optical filter as set forth in claim 1, wherein said acoustic transducer comprises a piezoelectric component integrated into said fiber.

8. The tunable optical filter as set forth in claim 1, wherein said acoustic transducer comprises an electrostrictive component integrated into said fiber.

9. A method of filtering an optical signal in a fiber, comprising the steps of:
    driving an acoustic transducer integrated into said fiber at a selected frequency to propagate an acoustic pressure wave longitudinally in said fiber, said acoustic pressure wave generating a plurality of alternating localized compressions and rarefactions in said fiber so as to effectuate a grating therein, wherein said grating reflects optical signals of a particular wavelength based on the periodicity of said plurality of alternating localized compressions and rarefactions; and controlling reflected optical signals' wavelength by modulating said selected frequency.

10. The method of filtering an optical signal in a fiber as set forth in claim 9, wherein said acoustic transducer comprises a selected section of said fiber having a piezoelectric effect.

11. The method of filtering an optical signal in a fiber as set forth in claim 9, wherein said acoustic transducer comprises a selected section of said fiber having an electrostrictive effect.

12. The method of filtering an optical signal in a fiber as set forth in claim 9, wherein said acoustic pressure wave has a frequency of substantially at around 5 Gigahertz.

13. An optical filter having a variable tuning range, comprising:

a fiber having a selected length and a selected diameter for conducting optical signals, wherein said fiber is selected from the group consisting of a single-mode fiber optimized at around 1550 nm, a single-mode fiber optimized at around 1310 nm, a multi-mode fiber optimized at around 1550 nm and a multi-node fiber optimized at around 1310 nm;

means for generating an acoustic pressure wave at a selected frequency, said acoustic pressure wave propagating along said fiber to generate a plurality of alternating localized compressions and rarefactions in said fiber so as to effectuate a grating therein, wherein said grating reflects optical signals of a particular wavelength based on the periodicity of said plurality of alternating localized compressions and rarefactions; and means for modulating said selected frequency of said acoustic pressure wave in a controlled manner so as to tune said grating.

14. A method of making a tunable optical filter comprising the steps of:

providing an optical fiber of a selected length and a selected diameter;

coupling an acoustic transducer to said optical fiber for generating an acoustic pressure wave of a selected frequency of substantially at around 5 Gigahertz, said acoustic pressure wave for propagating along said optical fiber to generate a plurality of alternating localized compressions and rarefactions in said optical fiber so as to effectuate a grating therein, wherein said grating reflects optical signals of a particular wavelength based on the periodicity of said plurality of alternating localized compressions and rarefactions; and coupling a controller to said acoustic transducer to modulate said selected frequency of said acoustic pressure wave in a controlled manner so as to tune said grating.

15. The method of making a tunable optical filter as set forth in claim 14, wherein said step of modulating said selected frequency of said acoustic pressure wave is effectuated by varying said acoustic transducer's input frequency.

16. The method of making a tunable optical filter as set forth in claim 14, wherein said step of providing an optical fiber further comprises the steps of:

providing a silica tube having an inside diameter that is substantially the same as said selected diameter of said optical fiber; and depositing a core material inside said silica tube for forming said optical fiber.

17. A method of making a tunable optical filter having an integrated acoustic transducer, comprising the steps of:

providing a silica tube having a selected length and a selected diameter;

depositing a core material inside said silica tube for forming an optical fiber; and heat-treating a selected portion of said optical fiber while under a predetermined electrical stress so as to form a piezoelectric transducer in said selected portion, wherein, upon actuation, said piezoelectric transducer propagates an acoustic pressure wave of a selected frequency along said optical fiber to generate a plurality of alternating localized compressions and rarefactions in said optical fiber so as to effectuate a grating therein such that said grating reflects optical signals of a particular wavelength based on the periodicity of said plurality of alternating localized compressions and rarefactions.

18. The method of making a tunable optical filter having an integrated acoustic transducer as set forth in claim 17, wherein said selected frequency of said acoustic pressure wave is substantially at around 5 Gigahertz.

19. The method of making a tunable optical filter having an integrated acoustic transducer as set forth in claim 17, wherein said optical fiber comprises a single-mode fiber optimized for around 1550 nm.

20. The method of making a tunable optical filter having an integrated acoustic transducer as set forth in claim 17, wherein said optical fiber comprises a multi-mode fiber optimized for around 1550 nm.

21. The method of making a tunable optical filter having an integrated acoustic transducer as set forth in claim 17, wherein said optical fiber comprises a single-mode fiber optimized for around 1310 nm.

22. The method of making a tunable optical filter having an integrated acoustic transducer as set forth in claim 17, wherein said optical fiber comprises a multi-mode fiber optimized for around 1310 nm.

* * * * *